United States Patent

[11] 3,564,961

| | | |
|---|---|---|
| [72] | Inventor | Rolf Burkhardt<br>Munchen-Pasing, Germany |
| [21] | Appl. No. | 806,933 |
| [22] | Filed | Mar. 13, 1969 |
| [45] | Patented | Feb. 23, 1971 |
| [73] | Assignee | Compur-Werk Gesellschaft mit<br>beschrankter Haftung & Co.<br>Munich, Germany |
| [32] | Priority | Mar. 20, 1968 |
| [33] | | Germany |
| [31] | | C17274 |

[54] MICROTOME PREPARATION HOLDER
3 Claims, 5 Drawing Figs.

[52] U.S. Cl.................................................. 83/412,
 83/915.5
[51] Int. Cl................................................... B26d 7/06
[50] Field of Search........................................... 83/412,
 415, 410, 409, 648, 915.5

[56] References Cited
UNITED STATES PATENTS

| 618,514 | 1/1899 | Low.............................. | 83/915.5X |
| 2,212,953 | 8/1940 | Popp et al...................... | 83/915.5 |
| 2,822,726 | 2/1958 | Blum............................. | 83/915.5UX |
| 3,286,575 | 11/1966 | Burkhardt..................... | 83/915.5X |
| 3,293,972 | 12/1966 | Burkhardt et al............. | 83/915.5X |

*Primary Examiner*—Frank T. Yost
*Attorney*—Larson, Taylor & Hinds

ABSTRACT: A microtome arrangement wherein a preparation holder is movable by means of a slide arrangement with respect to a cutting knife is provided wherein the position of the preparation holder relative to the cutting plane of the knife is adjustable. The preparation holder is formed as a segment of a disc and is received in a reciprocally shaped recess in the slide, the preparation holder being pivotable about an axis perpendicular to the path of movement of the slide and in close proximity to the cutting plane of the knife.

PATENTED FEB 23 1971 3,564,961

MICROTOME PREPARATION HOLDER

FIELD OF THE INVENTION

The present invention generally relates to a microtome arrangement including a cutting knife and a preparation holder mounted in a slide movable with respect to the knife.

BACKGROUND OF THE INVENTION

Preparations for medical use are generally encased within a cylindrical plastic envelope or casing. The preparations themselves are also generally of a cylindrical form and where the axis of the plastic casing and the axis of the preparation itself are nonaligned special problems are created in preparing cuts or slices from the preparation proper. To explain, where the axis of the preparation itself is skewed with respect to the axis of the plastic casing and where, as generally is the case, the plane of the cutting knife is arranged perpendicular to the axis of the plastic casing, a number of cuts will be made through the plastic encased preparation before a full section of preparation is provided. It will be appreciated that such a situation causes wastage of the preparation, inefficiency in the operation of the microtome and increases the number of cutting steps required before a full section is provided.

SUMMARY OF THE PRESENT INVENTION

In accordance with the present invention a microtome arrangement is provided wherein the number of preliminary cuts necessary before a full cross section of preparation is cut from the plastic encased preparation proper is reduced to a minimum and thus where wastage is reduced and efficiency is increased. This arrangement also reduces the operating time of the microtome and serves in protecting the cutting edge of the microtome knife. In accordance with the present invention the preparation holder is pivotable relative to the slide such that the orientation thereof with respect to the slide and thus with respect to the cutting plane may be varied. The preparation holder is pivotable about an axis which is substantially perpendicular to the path of movement of the slide and is located in close proximity to the cutting plane of the knife. The arrangement further includes means for fixing the orientation of the preparation holder with respect to the slide in a selected position.

In accordance with a presently preferred embodiment of the invention the preparation holder is formed as a segment of a disc and is received in a reciprocally shaped recess in the slide. A guide projection on the disc segment rides in an annular recess or guideway in the slide. Means are provided for clamping the preparation holder to the slide including a member received in a slot in the preparation holder and adapted to be clamped to the slide. A setting knob and an associated setting scale provide for adjustment of the angular position of the preparation holder with respect to the slide. The setting knob is coupled through a gearing arrangement to a toothed sector gear affixed to the preparation holder.

Further features and advantages of the present invention will be set forth in or apparent from the detailed description of a presently preferred embodiment of the invention found hereinbelow.

DESCRIPTION OF A PREFERRED EMBODIMENT

Figure 1:
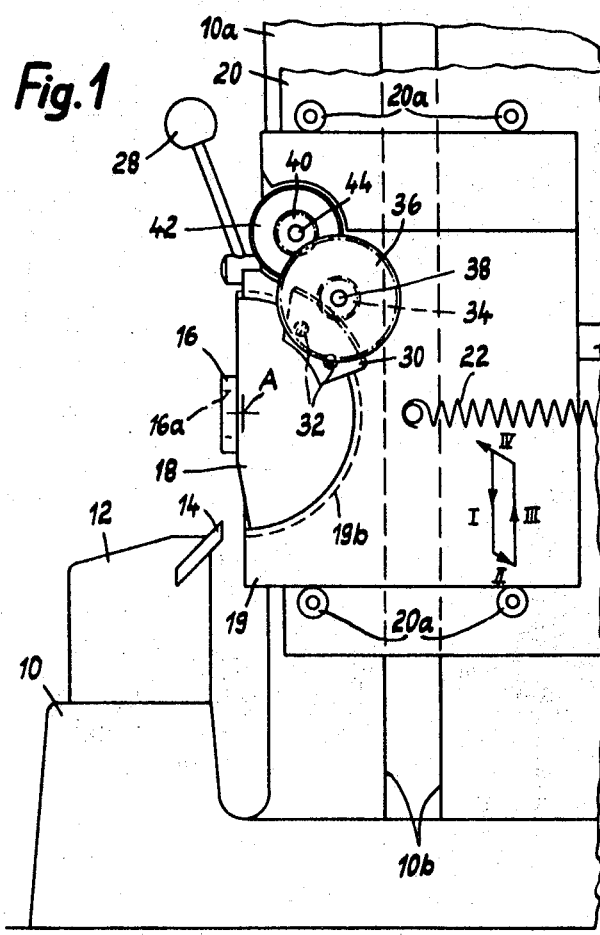
FIG. 1 is a fragmentary front view of a microtome in accordance with a presently preferred embodiment of the invention.
Figure 2:
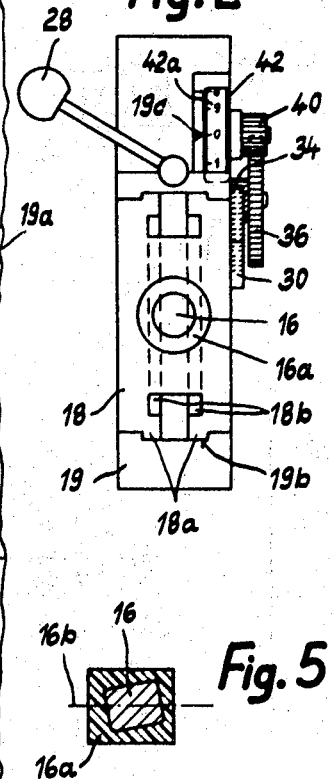
FIG. 2 is a side view of a portion of FIG. 1 showing the preparation holder and slide.

Referring to FIG. 1, a microtome is mounted on a base plate 10 which includes a holder 12 for a cutting knife 14, holder 12 being shown diagrammatically. Holder 12 is preferably adjustable in three planes and is adapted to be fixed in any selected position to enable the cutting edge of the knife to be oriented in an optimum position with respect to the preparation holder. See, for example, U.S. Pat. No. 3,308,704 assigned to the same assignee as the present invention for a suitable knife holder construction.

A preparation holder 18 supports a preparation 16 which is encased in a cylindrical envelope 16a constructed for example of a plastic material, envelope 16a being inserted into the preparation holder 18 and held by suitable clamping means (not shown). Preparation holder 18 is formed as a segment of a disc and is received in a reciprocally shaped recess in a slide 19. This mounting of preparation 18 is slide 19 permits pivoting of preparation 18 in both counterclockwise and clockwise directions as is described in more detail hereinbelow. Slide 19 is mounted for horizontal displacement between upper and lower roller guideways 20a affixed to a main slide 20. The main slide 20 is itself adjustable along a vertical wall 10a of base plate 10 and is movable in a vertical direction. Return springs (not shown) are utilized to bias the main slide 20 into the upper limit position thereof. The main slide 20 is moved up and down at a constant speed and with a constant stroke by suitable driving means (not shown) such as an eccentric cam drive. Such a driving means may comprise a motor-driven cardioid cam which served to drive the main slide 20 downward during the cutting stroke against the biasing action of the return springs. The return springs serve to return the slide to the upper limit position thereof and thus this arrangement produces a continual up and down motion of the preparation holder 18 with respect to the fixed cutting knife 14 such that a plurality of discs or slices of the preparation may be produced.

A spring 22 engages slide 19 and main slide 20 and ensures abutment between a projection 19a on slide 19 and a setting wedge (not shown). The setting wedge serves in providing fine adjustment of slide 19 relative to cutting knife 14 and forms part of a fine and coarse adjustment arrangement described in commonly assigned U.S. Pat. No. 3,293,972. This arrangement forms no part of the present invention and reference is made to the aforesaid U.S. Pat. No. 3,293,972 regarding further details thereof.

As shown in FIG. 1 the preparation holder 18 is pivotable about an axis A which lies generally perpendicular to the plane of the path of movement of both slides 19 and 20, these paths themselves being generally orthogonal as described hereinabove. Preparation holder 18 includes an angular guide projection 18a which is received in a reciprocally shaped guide groove 19b in slide 19. Preparation holder 18 further includes an inwardly directed T-shaped guide groove 18b which is adapted to received a T-shaped slide member 24. Slide member 24 includes a stepped aperture 24a adapted to receive a headed screw 26 which serves in clamping member 24 to slide 19 and thus in clamping preparation holder 18 in a selected position. Axial movement of screw 26 is controlled by a clamping lever 28 through a suitable arrangement (not shown) for converting the rotary motion of clamping lever 28 into a force for producing axial movement of screw 26. As shown in Fig. 1 axis A described above is located in close proximity to the cutting plane of cutting knife 14 to prevent tilting moments during the cutting operation.

The desired angular position of preparation holder 18 may be determined through a setting arrangement including a toothed sector gear mounted on one side face of preparation holder 18 by suitable means such as screws 32. Sector gear 30 engages a pinion 34 mounted on a common bearing pin 38 with a further pinion 36. Pinion 36 engages a toothed gear 40 connected to a knurled setting knob 42. Gear 40 and knob 42 are mounted on a common shaft formed by a mounting pin 44. A scale 42a located on the periphery of setting knob 42 cooperates with a fixed mark 19c on slide 19 to provide an indication of the position of preparation holder 18.

Figure 5:
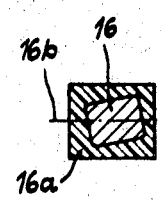
FIG. 5 is a longitudinal section taken through a preparation and the envelope therefore.

Considering the operation of the microtome arrangement of the invention, as set forth hereinabove, in many instances the cut produced by cutting knife 14 on preparation 16 for the normal setting of preparation holder 18 relative to cutting knife 14 will not produce a full cross-sectional cut of preparation. As explained, the preparation 16 assume a number of positions relative to the cylindrical plastic sleeve 16a and thus where the axis of the preparation 16 is skewed relative to the axis of the cylindrical plastic sleeve 16a a cut perpendicular to sleeve 16a will not be perpendicular to preparation 16. In more extreme cases the axis of preparation 16 may be sharply inclined relative to the axis 16b of the cylindrical sleeve 16a as illustrated in FIG. 5. It will be appreciated that with such a preparation and with the cutting knife 14 arranged relative to the preparation holder 18 as described a number of cuts will have to be taken in the preparation proper before a full section through preparation 16 is produced. The present invention reduces the number of preparatory cuts necessary, increases the efficiency of the operation of the microtome and reduces waste, by permitting pivoting or rotation of preparation holder 18 about axis A in either a counterclockwise or clockwise direction depending on the particular inclination and positioning of the preparation 16 within the plastic sleeve 16a.

Figure 4:
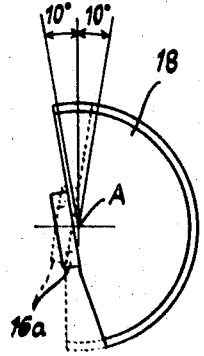
FIG. 4 shows a detail of FIG. 1 and illustrates the movement of the preparation holder.
Figure 3:
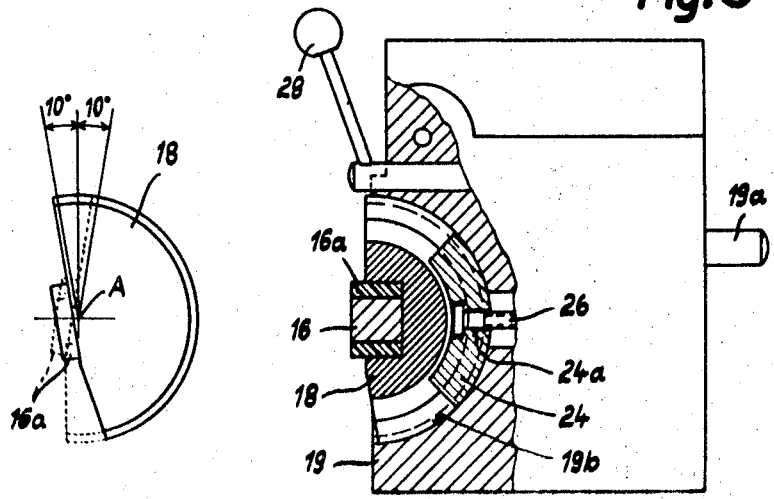
FIG. 3 is a front view of the slide of FIG. 1 partially broken away to show the details thereof.

To produce a desired angular setting of preparation holder 18 the clamping arrangement including slide member 24 and headed screw 26 loosened, through operation of clamping lever 28, so that preparation holder 18 may be pivoted. Rotation of setting knob 42 is transmitted through the gearing arrangement including gear 40, pinions 36 and 34, and sector gear 30 to produce a corresponding rotation of preparation holder 18. In accordance with a presently preferred embodiment the transmission ratio of the gearing arrangement is 1:36 such that a complete rotation of knob 42 will cause preparation holder 18 to move through an angular interval of 10° (see FIG. 4). As shown in FIG. 4 this 10° angular rotation of preparation holder 18 may be effected in a clockwise or counterclockwise direction. The angular position of scale 42a on knob 42 relative to fixed mark 19c provides an indication of the angular interval through which preparation holder 18 is turned. Upon selection of a desired angular position preparation holder 18 is reclamped to slide 19 through the clamping arrangement described hereinabove. Once the angular position of preparation holder has been set the normal operation of the microtome proceeds, the main slide 20 and slide 19 following a path of movement during each cutting operation generally corresponding to that diagrammatically illustrated by arrows I, II, III and IV in FIG. 1. Reference is made to U.S. Pat. No. 3,293,972 referred to hereinabove for a further description of this operation. It is noted that the skewed portions of the cutting path, that is, portions II and IV are produced by the particular wedge arrangement described in that patent. It will be appreciated that rotation of setting knob 42 will enable preparation holder 18 to be set in an optimum angular position relative to the preparation 16 so that the efficiency of the cutting procedure is substantially increased.

It will be understood by those skilled in the art that the embodiment of the invention shown and described herein is subject to various modifications without departing from the scope and spirit of the invention. Accordingly, it should be understood that the invention is not limited by the exemplary embodiments shown and described.

I claim:

1. The combination of a microtome having a cutting knife and a preparation holder mounted in a slide relatively movable with respect to the microtome knife, wherein the improvement comprises means for providing pivoting of the preparation holder with respect to the about an axis substantially at right angles to the path of movement of the slide to permit variation in the orientation of the holder with respect to the knife, said axis being located in close proximity to the cutting plane of the knife, and clamping means for fixing the orientation of the holder with respect to the slide and thus with respect to the knife, said preparation holder being formed as a segment of a disc and including a guide projection and said slide including a correspondingly reciprocally shaped recess therein for receiving said disc segment and an arcuate guideway for receiving said guide projection.

2. The combination claimed in claim 1 wherein said clamping means comprises means defining a T-shaped slot formed in said preparation holder, a T-shaped member received in said slot, and means for securing said T-shaped member to said slide to fix the orientation of said preparation holder with respect to said slide.

3. The combination claimed in claim 1 further comprising a setting knob, a setting scale for providing an indication of the angular position of said setting knob, a toothed sector gear affixed to said preparation holder, and means for transmitting movement of said setting knob to said sector gear and thus to said preparation holder.